United States Patent
Bingle et al.

(10) Patent No.: US 6,692,056 B2
(45) Date of Patent: Feb. 17, 2004

(54) SAFETY RELEASE FOR A TRUNK OF A VEHICLE

(75) Inventors: Robert L. Bingle, Holland, MI (US); Roger L. Koops, Hamilton, MI (US); Niall R. Lynam, Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 10/144,506

(22) Filed: May 13, 2002

(65) Prior Publication Data

US 2002/0135196 A1 Sep. 26, 2002

Related U.S. Application Data

(63) Continuation of application No. 09/516,831, filed on Mar. 1, 2000, now Pat. No. 6,390,529, which is a continuation-in-part of application No. 09/275,565, filed on Mar. 24, 1999, now Pat. No. 6,086,131, and a continuation-in-part of application No. 09/484,754, filed on Jan. 18, 2000, now Pat. No. 6,480,103.

(51) Int. Cl.[7] ............................ B62D 25/12; E05B 3/00; B60Q 3/06; F21S 10/00

(52) U.S. Cl. ...................... 296/76; 362/496; 362/501; 362/276; 362/464; 292/336.3; 292/DIG. 43

(58) Field of Search ........................... 276/76; 362/488, 362/496, 501, 540, 276, 802, 464, 155; 292/347, 336.3, DIG. 43, DIG. 29, 1; 49/503

(56) References Cited

U.S. PATENT DOCUMENTS

| | | | |
|---|---|---|---|
| 1,523,495 A | 1/1925 | Silberman | 362/501 |
| 1,629,456 A | 5/1927 | Pellegrini | 362/501 |
| 1,684,499 A | 9/1928 | Mayer | 292/336.3 |

(List continued on next page.)

FOREIGN PATENT DOCUMENTS

| | | | |
|---|---|---|---|
| DE | 2636099 | 2/1978 | |
| DE | 3732936 | 9/1987 | |
| DE | 9006007 | 6/1991 | |
| EP | 0235372 | 11/1986 | |
| EP | 1039077 | 9/2000 | E05B/65/19 |
| GB | 2252438 A | 8/1992 | |
| GB | 2266799 A | 11/1993 | |
| JP | 58188458 | 12/1983 | E05B/65/19 |
| JP | 1-182478 | * 7/1989 | 292/336.3 |
| WO | WO 9739920 | 10/1997 | B60R/21/32 |
| WO | WO 9813235 | 4/1998 | B60R/25/10 |
| WO | WO 9904119 | 1/1999 | E05B/65/19 |

OTHER PUBLICATIONS

Prosecution File for Reissue Application 09/344,384, filed Jun. 24, 1999, for Reissue of U.S. Patent 5,859,479 already of record.

Commonly assigned, co–pending U.S. patent application Ser. No. 09/484,754 filed Jan. 18, 2000 by McCarthy et al.

(List continued on next page.)

*Primary Examiner*—D. Glenn Dayoan
*Assistant Examiner*—Hilary Gutman
(74) *Attorney, Agent, or Firm*—Van Dyke, Gardner, Linn & Burkhart, LLP

(57) ABSTRACT

A user operable release system for a trunk compartment of a vehicle is provided which is positionable within the trunk compartment of the vehicle so as to allow for opening of the deck lid by a user within the trunk compartment. The release system includes a user actuable input device for actuating a release mechanism of the deck lid in order to open the compartment, a housing, and at least one illumination source, which is operable to provide illumination for the user actuable input device. The housing includes at least one wall defining a recess and a perimeter surface at an outer edge of the recess. The user actuable input device is positioned within the recess such that the user actuable input device is within the recess inwardly of the perimeter surface. The illumination source is positioned at the housing and/or at the user actuable input device.

68 Claims, 4 Drawing Sheets

U.S. PATENT DOCUMENTS

| | | | |
|---|---|---|---|
| 1,721,347 A | 7/1929 | Macrae et al. ............... | 362/501 |
| 2,117,160 A | 5/1938 | Gale ...................... | 292/336.3 |
| 2,360,227 A | 10/1944 | Hemphill .................... | 362/464 |
| 2,688,865 A | 9/1954 | Foster et al. .................. | 70/129 |
| 2,760,050 A * | 8/1956 | Porsche ....................... | 362/100 |
| 3,016,968 A | 1/1962 | Lenz et al. ................... | 180/82 |
| 3,209,563 A * | 10/1965 | Pelcin ........................ | 292/173 |
| 3,241,344 A | 3/1966 | Peters ....................... | 70/279 |
| 3,553,448 A | 1/1971 | Davis et al. ................ | 240/7.1 |
| 3,582,639 A | 6/1971 | Chamberlain ............... | 240/7.1 |
| 3,596,484 A | 8/1971 | Peters ........................ | 70/240 |
| 3,678,716 A | 7/1972 | Cobb ........................... | 70/92 |
| 3,759,556 A | 9/1973 | Wright ....................... | 292/33 |
| 3,766,539 A | 10/1973 | Bradshaw et al. ........... | 340/258 |
| 3,829,693 A | 8/1974 | Schwarz ................... | 250/338 |
| 3,839,640 A | 10/1974 | Rossin ...................... | 250/353 |
| 3,956,732 A | 5/1976 | Teich ......................... | 340/64 |
| 3,992,909 A * | 11/1976 | McGhee ................ | 292/336.3 |
| 4,007,955 A | 2/1977 | Kobayashi ................. | 292/216 |
| 4,052,716 A | 10/1977 | Mortensen ................. | 340/233 |
| 4,080,812 A * | 3/1978 | Knott ................ | 292/DIG. 43 |
| 4,122,371 A | 10/1978 | Talmage et al. ............ | 362/464 |
| 4,127,966 A | 12/1978 | Schmidt ..................... | 49/141 |
| 4,155,233 A * | 5/1979 | Lira .................. | 292/DIG. 43 |
| 4,166,955 A | 9/1979 | Keller ........................ | 250/342 |
| 4,242,669 A | 12/1980 | Crick ........................ | 340/567 |
| 4,312,197 A | 1/1982 | Carrion et al. ................ | 70/135 |
| 4,318,089 A | 3/1982 | Frankel et al. ............. | 340/567 |
| 4,322,959 A | 4/1982 | Mochida ..................... | 70/241 |
| 4,342,210 A | 8/1982 | Denningham ................ | 70/278 |
| 4,365,232 A | 12/1982 | Miller ...................... | 362/464 |
| 4,371,205 A | 2/1983 | Kaveney, Jr. ................ | 292/48 |
| 4,379,971 A | 4/1983 | Smith et al. ................ | 250/342 |
| 4,384,207 A | 5/1983 | Doctor ...................... | 250/349 |
| 4,403,172 A * | 9/1983 | Sasaki et al. ................. | 315/77 |
| 4,418,335 A | 11/1983 | Genähr ...................... | 340/565 |
| 4,437,003 A | 3/1984 | Doctor ...................... | 250/338 |
| 4,441,023 A | 4/1984 | Doctor et al. .............. | 250/338 |
| 4,464,649 A | 8/1984 | Her .............................. | 340/72 |
| 4,468,657 A | 8/1984 | Rossin ...................... | 340/555 |
| 4,482,179 A | 11/1984 | Johnson ................. | 292/336.3 |
| 4,507,654 A | 3/1985 | Stolarczyk et al. .......... | 340/545 |
| 4,546,417 A | 10/1985 | Watts ........................ | 362/84 |
| 4,556,796 A | 12/1985 | Renals ...................... | 250/338 |
| 4,604,524 A | 8/1986 | Kotlicki et al. ............. | 250/342 |
| 4,612,442 A | 9/1986 | Toshimichi ................. | 250/353 |
| 4,645,233 A | 2/1987 | Bruse et al. ................. | 280/808 |
| 4,667,990 A | 5/1987 | Quantz ...................... | 292/201 |
| 4,697,081 A | 9/1987 | Baker ....................... | 250/338 |
| 4,704,533 A | 11/1987 | Rose et al. ................. | 250/342 |
| 4,709,153 A | 11/1987 | Schofield ................... | 250/353 |
| 4,745,284 A | 5/1988 | Masuda et al. ............. | 250/338 |
| 4,746,910 A | 5/1988 | Pfister et al. ............... | 340/567 |
| 4,752,768 A | 6/1988 | Steers et al. ............... | 340/567 |
| 4,764,755 A | 8/1988 | Pedtke et al. ............... | 340/541 |
| 4,775,347 A | 10/1988 | Takada et al. ................ | 445/44 |
| 4,796,013 A | 1/1989 | Yasunda et al. ............. | 340/562 |
| 4,797,657 A | 1/1989 | Vorzimmer et al. ......... | 340/541 |
| 4,825,079 A | 4/1989 | Takamatsu et al. ...... | 250/338.3 |
| 4,848,114 A | 7/1989 | Rippe ........................ | 70/263 |
| 4,848,509 A | 7/1989 | Bruhnke et al. ............ | 180/297 |
| 4,857,912 A | 8/1989 | Everett, Jr. et al. ...... | 340/825.3 |
| 4,868,390 A | 9/1989 | Keller et al. ............ | 250/338.3 |
| 4,881,148 A | 11/1989 | Lambropoulos et al. .... | 361/172 |
| 4,895,009 A | 1/1990 | Kleefeldt et al. ............ | 70/264 |
| 4,928,212 A | 5/1990 | Benavides ................. | 362/501 |
| 4,930,864 A | 6/1990 | Kuster et al. .............. | 350/167 |
| 4,933,668 A | 6/1990 | Oyer et al. ................ | 340/541 |
| 4,952,808 A | 8/1990 | Turnbull et al. ......... | 250/338.3 |
| 4,954,813 A | 9/1990 | August, Sr. et al. ........ | 340/571 |
| 4,979,384 A | 12/1990 | Malesko et al. ............... | 70/241 |
| 4,981,314 A | 1/1991 | Carr .......................... | 292/347 |
| 4,982,094 A | 1/1991 | Matsuda .................... | 250/342 |
| 5,003,800 A | 4/1991 | Bublewicz .................. | 70/264 |
| 5,027,104 A | 6/1991 | Reid ......................... | 340/541 |
| 5,030,012 A | 7/1991 | Hagins et al. ................ | 374/31 |
| 5,045,702 A | 9/1991 | Mulleer ..................... | 250/342 |
| 5,054,686 A | 10/1991 | Chaung .................... | 236/49.3 |
| 5,054,826 A | 10/1991 | Dow et al. ................. | 292/125 |
| 5,063,371 A | 11/1991 | Oyer et al. ................. | 340/541 |
| 5,071,160 A | 12/1991 | White et al. ................ | 280/735 |
| 5,077,549 A | 12/1991 | Hershkovitz et al. ........ | 340/567 |
| 5,084,696 A | 1/1992 | Guscott et al. ............. | 340/541 |
| 5,093,656 A | 3/1992 | Dipoala ..................... | 340/522 |
| 5,166,679 A | 11/1992 | Vranish et al. ........ | 340/870.37 |
| 5,174,643 A | 12/1992 | Priesemuth ................. | 362/464 |
| 5,216,407 A | 6/1993 | Hwang ..................... | 340/426 |
| 5,219,413 A | 6/1993 | Lineberger ................. | 180/272 |
| 5,231,359 A | 7/1993 | Masuda et al. ............. | 324/675 |
| 5,283,551 A | 2/1994 | Guscott .................... | 340/567 |
| 5,297,010 A | 3/1994 | Camarota et al. ........... | 362/540 |
| 5,317,620 A | 5/1994 | Smith ......................... | 379/40 |
| 5,349,329 A | 9/1994 | Smith ........................ | 340/539 |
| 5,383,703 A | 1/1995 | Irvine, III ................... | 296/181 |
| 5,404,128 A | 4/1995 | Ogino et al. ............. | 340/425.5 |
| 5,406,171 A | 4/1995 | Moody ..................... | 362/464 |
| 5,409,273 A | 4/1995 | Claar et al. ................ | 292/201 |
| 5,424,711 A | 6/1995 | Müller et al. ............. | 340/426 |
| 5,424,712 A | 6/1995 | Rosenberger .............. | 340/426 |
| 5,424,718 A | 6/1995 | Müller et al. ............. | 340/567 |
| 5,445,326 A * | 8/1995 | Ferro et al. .......... | 292/DIG. 43 |
| 5,482,314 A | 1/1996 | Corrado et al. ............. | 280/735 |
| 5,486,810 A | 1/1996 | Schwarz ................... | 340/521 |
| 5,512,836 A | 4/1996 | Chen et al. ................. | 324/687 |
| 5,525,843 A | 6/1996 | Höwing ..................... | 307/9.1 |
| 5,580,153 A | 12/1996 | Motz ........................ | 362/496 |
| 5,581,230 A | 12/1996 | Barrett ...................... | 362/501 |
| 5,585,625 A | 12/1996 | Spies ........................ | 250/221 |
| 5,636,536 A | 6/1997 | Kinnucan ..................... | 70/107 |
| 5,663,704 A | 9/1997 | Allen et al. ................. | 340/426 |
| 5,693,943 A | 12/1997 | Tchernihovski et al. .... | 250/342 |
| 5,711,559 A | 1/1998 | Davis ........................ | 292/340 |
| 5,719,551 A | 2/1998 | Flick ........................ | 340/426 |
| 5,726,629 A | 3/1998 | Yu ............................. | 340/565 |
| 5,737,083 A | 4/1998 | Owechko et al. ........... | 356/375 |
| 5,793,291 A | 8/1998 | Thornton ................. | 340/425.5 |
| 5,802,479 A | 9/1998 | Kithil et al. ................... | 701/45 |
| 5,805,056 A | 9/1998 | Mueller et al. ............. | 340/426 |
| 5,848,802 A | 12/1998 | Breed et al. ................ | 280/735 |
| 5,859,479 A * | 1/1999 | David .................. | 292/DIG. 65 |
| 5,887,466 A | 3/1999 | Yoshizawa .................. | 70/257 |
| 5,914,610 A | 6/1999 | Gershenfeld et al. ........ | 324/663 |
| 5,933,090 A | 8/1999 | Christenson ............ | 340/825.69 |
| 5,938,321 A | 8/1999 | Bos et al. ................... | 362/494 |
| 5,949,340 A | 9/1999 | Rossi ..................... | 340/425.5 |
| 5,986,549 A | 11/1999 | Teodorescu ................ | 340/561 |
| 6,018,292 A * | 1/2000 | Penny, Jr. .................. | 340/426 |
| 6,024,388 A | 2/2000 | Tomah et al. .............. | 292/216 |
| 6,028,509 A | 2/2000 | Rice ...................... | 340/425.5 |
| 6,043,735 A * | 3/2000 | Barrett ....................... | 340/436 |
| 6,051,981 A | 4/2000 | Gershenfeld et al. ........ | 324/663 |
| 6,086,131 A * | 7/2000 | Bingle et al. .................. | 296/76 |
| 6,091,322 A | 7/2000 | Ang et al. ................ | 340/425.5 |
| 6,104,293 A | 8/2000 | Rossi ..................... | 340/425.5 |
| 6,130,614 A | 10/2000 | Miller et al. ............. | 240/425.5 |
| 6,135,514 A | 10/2000 | Kowalewski et al. ........ | 292/216 |
| 6,139,172 A | 10/2000 | Bos et al. ................... | 362/494 |
| 6,158,788 A * | 12/2000 | Ikeda et al. ............. | 292/336.3 |
| 6,164,805 A * | 12/2000 | Hulse ........................ | 362/501 |

| | | | |
|---|---|---|---|
| 6,166,625 A | 12/2000 | Teowee et al. | 340/426 |
| 6,208,241 B1 * | 3/2001 | Barrett | 340/438 |
| 6,209,933 B1 * | 4/2001 | Ang et al. | 292/336.3 |
| 6,222,442 B1 | 4/2001 | Gager et al. | 340/426 |
| 6,247,732 B1 * | 6/2001 | Alton | 292/DIG. 43 |
| 6,254,261 B1 | 7/2001 | Bingle et al. | 362/501 |
| 6,275,146 B1 | 8/2001 | Kithil et al. | 340/425.5 |
| 6,335,687 B1 | 1/2002 | Terashima et al. | 340/573.1 |
| 6,339,376 B1 | 1/2002 | Okada | 340/562 |
| 6,349,984 B1 | 2/2002 | Marrazzo et al. | 292/336.3 |
| 6,369,395 B1 * | 4/2002 | Roessler | 292/336.3 |
| 6,390,529 B1 | 5/2002 | Bingle et al. | 296/76 |
| 6,394,511 B1 * | 5/2002 | Lam et al. | 292/336.3 |
| 6,402,357 B1 * | 6/2002 | Myers | 362/557 |
| 6,433,292 B1 * | 8/2002 | Tate | 200/512 |
| 6,527,313 B2 * | 3/2003 | Takahashi et al. | 292/336.3 |
| 2001/0030871 A1 * | 10/2001 | Anderson, Jr. et al. | 362/488 |
| 2002/0033609 A1 * | 3/2002 | Baik | 292/336.3 |
| 2002/0047279 A1 * | 4/2002 | Byrla et al. | 292/336.3 |
| 2002/0063432 A1 * | 5/2002 | Choi | 292/336.3 |

OTHER PUBLICATIONS

Commonly assigned, co–pending U.S. patent application, Ser. No. 09/648,560 filed Aug. 24, 2000 by Bingle et al.

Commonly assigned, co–pending U.S. patent application, Ser. No. 09/852,483, entitled Safety Handle for Opening the Trunk of a Vehicle from Inside, filed May 10, 2001 by Robert L. Bingle et al. (DON01 P–898).

U.S. Publication No. 2002/0003571, published Jan. 10, 2002, for commonly assigned, co–pending U.S. patent application, Ser. No. 09/793,002, entitled Video Mirror Systems Incorporating an Accessory Module, filed Feb. 26, 2001 by Kenneth Schofield et al. (DON01 P–869).

"Kit 62 Movement Detector Compontnts", Sep. 24, 1994, p. 1–5.

* cited by examiner

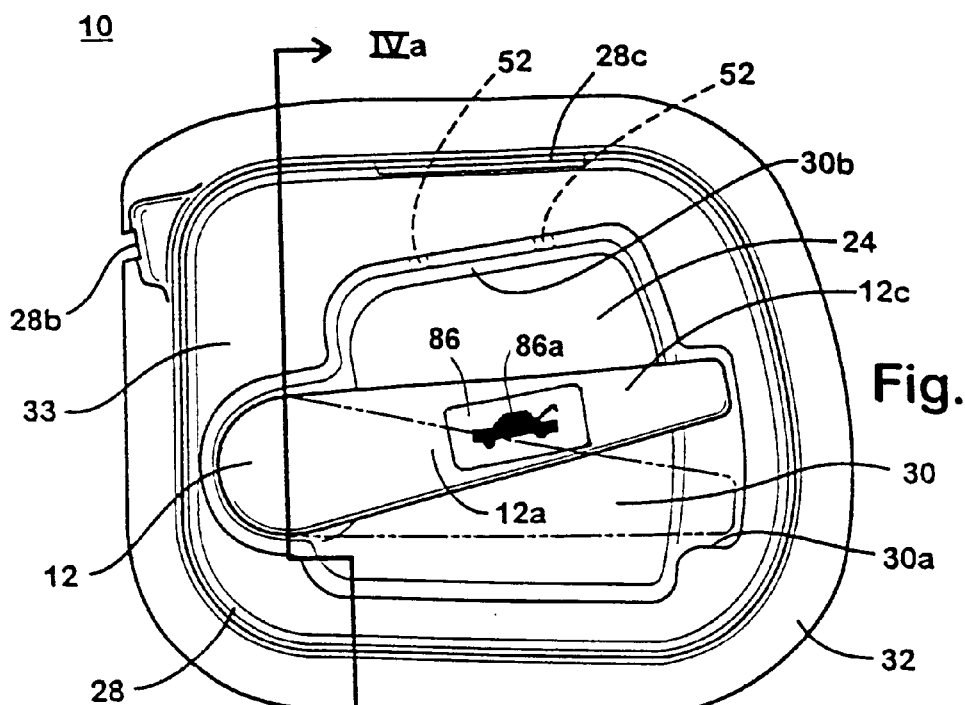
Fig. 3
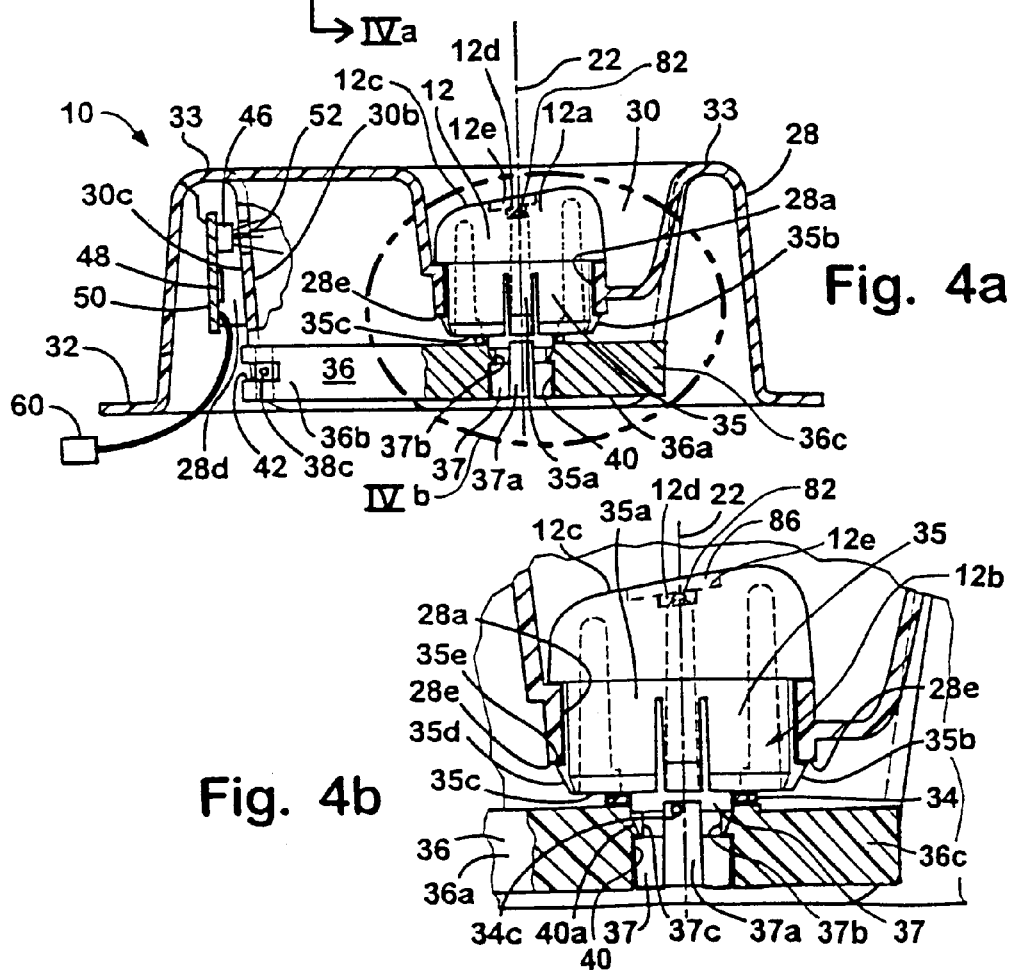
Fig. 4a
Fig. 4b

SAFETY RELEASE FOR A TRUNK OF A VEHICLE

CROSS-REFERENCE TO RELATED APPLICATIONS

The present application is a continuation of U.S. pat. application, Ser. No. 09/516,831, filed Mar. 1, 2000, now U.S. Pat. No. 6,390,529, which is a continuation-in-part of U.S. Pat. application, Ser. No. 09/275,565, filed Mar. 24, 1999 for SAFETY HANDLE FOR TRUNK OF VEHICLE by Robert L. Bingle and Roger L. Koops, now U.S. Pat. No. 6,086,131, and a continuation-in-part of co-pending U.S. Pat. application Ser. No. 09/484,754, filed Jan. 18, 2000 for COMPARTMENT SENSING SYSTEM by McCarthy et al., now U.S. Pat. No. 6,480,103, which are all hereby incorporated by reference in their entirety herein.

BACKGROUND OF THE INVENTION

This invention relates generally to a mechanism for opening a door to a compartment and, more particularly, to a mechanism for opening a deck lid of a vehicle from inside the space enclosed by the deck lid.

Typically, the deck lid or door to a trunk space is opened by a key being inserted and turned in a lock cylinder from a position exteriorly of the deck lid or by a button or lever that is positioned within the passenger compartment of the vehicle. While it has been suggested that a handle be placed in the interior of the trunk space, because of numerous difficulties, to date, vehicle manufacturers have not included a device specifically for opening the trunk from the inside of the trunk space. Even fold down rear seats, which are common in many vehicles today, cannot be folded down from within the trunk space. Although placement of a release mechanism in the trunk space has been suggested in the prior art, no commercially acceptable mechanism or device has been developed. Therefore, if a person is within the trunk space when the deck lid is closed, there is no way for a person to open the deck lid and get out of the trunk.

When the deck lid is closed, the space within the trunk is typically small and very dark. Although a light source is typically provided in a trunk to provide light to the trunk space when the trunk space is open, these lights are deactivated when the trunk is closed, in order to prevent excessive drain on the battery of the vehicle. Therefore, when a person is trapped within a trunk, it is nearly impossible to see anything within the trunk, such that even if a release mechanism were operable within the trunk, a person would not be able to find the mechanism after the deck lid had been closed. Furthermore, due to the cramped and tight space within a trunk, a person's movements to reach and operate a release mechanism are extremely restricted.

This inability to open a trunk of a vehicle from inside the trunk space has unfortunately led to many injuries and even deaths over the years. When the deck lid is closed, the interior space of the trunk may reach extreme temperatures during the summer time, such that a person can only survive therein for a short period of time. Typically, these injuries and deaths occur to children, who enter the trunk to either play or hide and then trap themselves within the trunk by closing the deck lid.

Because a person trapped within the trunk of the vehicle may be a small child, the person's abilities to respond to a release mechanism within the trunk may be limited. Even if a handle, button or the like is visible to a child, the child may be too afraid to even attempt to use the device or may be too weak to activate the release mechanism. Because there is no way to detect the child within the trunk, the child may remain trapped therein until the trunk is opened from the outside.

Therefore, there is a need in the art for an interior trunk release mechanism which is highly visible under minimal lighting conditions such as when the deck lid of the trunk is closed. Furthermore, the release mechanism should be easily recognizable and operable even by children, and should avoid damage or deterioration of existing vehicle systems, such as the battery or electrical system, while remaining operable even when the vehicle is shut off. In the event that an occupant in the trunk may be a small child, the release mechanism preferably should be operable to automatically detect the presence of a person within the trunk and to automatically assist the person in opening the trunk in response to such detection.

SUMMARY OF THE INVENTION

The present invention is intended to provide a mechanical apparatus for activating a release mechanism for a deck lid of a trunk of a vehicle from within the interior space of the trunk.

According to a first aspect of the present invention, a release system is adapted for use in opening a deck lid of a vehicle and is positionable within a compartment substantially enclosed by the deck lid. The release system comprises an electrically operable actuating device which is connectable to the release mechanism and at least one of a manual input device and an occupant detector, said actuating device being operable to at least partially actuate the release mechanism to open the deck lid in response to a user input to said manual input device or a detection of an occupant within the compartment by said occupant detector. Preferably, the release system comprises a self contained release module which is connectable to the release mechanism of the deck lid and electrically connected to a power source, such as a vehicle battery or the like.

Preferably, the occupant detector comprises a temperature sensor and/or motion sensor and determines the presence of a person or animal within the trunk in response to detection of motion or a predetermined temperature. Preferably, the manual input device comprises a handle and may further comprise a handle sensor at the handle which is operable to detect movement of the handle and/or touching of the handle. The handle may comprise a bright color and be in contrast to a dark background upon which it is installed. Preferably, the color is selected to convey a safe and friendly image to a child, such as a yellow or bright green color.

The assist device is operable to ease manual operation of the handle as the handle is moved to activate the release mechanism. The assist device may also be operable independent of any manual movement of the handle, while the handle may be operable independent of the assist device, in case power is disconnected from the assist device. Preferably, the assist device comprises an electrically operated solenoid, a gas-operated piston, or a compressed spring which is connected to the handle or to a lever or extension connected to the handle.

In one form, the release system may further comprise an illumination source. Preferably, the illumination source comprises a self-luminous light, such as a Tritium gas capsule, and/or may comprise a non-incandescent light, such as a light emitting diode or any other illumination source. The illumination source is operable to provide either direct or indirect illumination to the handle of the present invention. The illumination source may be temporarily activated upon closure of the deck lid and may be further activated upon an activating event, such as movement of the handle or detection of a person or animal within the trunk space by the occupant detector.

In another form, the release system includes a control, which is operable to activate the actuating device in response to said manual input device and/or said occupant detector. The control may be further operable to activate and deactivate the illumination source in response to one or more activating events, and may provide an audio signal to an occupant in response to detection of the occupant.

According to another aspect of the present invention, the release system includes a handle, a release assist device, an occupant detection system, an illumination source and a control circuit. The handle is interconnected to a release mechanism of the compartment and at least partially provides a mechanical advantage such that the release mechanism may be activated upon exertion of less than 20 Newtons in a predetermined direction on the handle. The illumination source provides illumination to the handle and is activated by the control circuit upon an occurrence of an activating event.

According to yet another aspect of the present invention, a release system is adapted for use in opening a compartment of a vehicle and is positionable within the compartment and substantially enclosed by a lid. The lid is openable by an electrically controlled latch. The release system is adapted to activate the latch in response to an activation of the release system.

In one form, the release system includes an electro-mechanical device which activates the latch when at least a portion of the device is moved. Preferably, the electro-mechanical device is a button and the activation is a pressing of the button.

In another form, a release system adapted for use in opening a deck lid of a vehicle is provided, the release system being positionable within a vehicle compartment (such as a trunk compartment) that is at least partially closed by the deck lid, the compartment having a release mechanism for opening the deck lid. The release system is adapted for operation from the interior of the compartment and includes an assist device. The assist device is connectable to the release mechanism and comprises at least one of an electrically operable actuating device, a mechanically operable actuating device and a gas operable actuating device. The release system includes at least one of a manual input device and an occupant detector. The assist device is operable to actuate the release mechanism to open the deck lid in response to either or both of a user input to the manual input device or a detection of an occupant within the compartment by the occupant detector. In one embodiment, the assist device comprises a solenoid. In another embodiment, the assist device comprises a gas operable actuating device, such as a piston in communication with a compressed gas source, which is connectable to the release mechanism. In yet another embodiment, the assist device comprises a mechanically operable actuating device such as compressed spring member.

Therefore, the present invention provides a trunk release system which is easily recognizable and operable by a child, as children are the ones typically harmed by being trapped in a trunk. The release system is easy to activate and is preferably a bright friendly color so as not to frighten or confuse a child who may be trapped within the trunk. Preferably, the release system further comprises an automatic assist device which is operable to automatically assist a person to activate the trunk release in response to a detection of a person within the trunk and/or an attempt by the person to activate the release mechanism. Furthermore, an illumination source is preferably provided to increase the visibility of the release mechanism. The illumination source should only be activated for a limited period of time in order to prevent excessive drain on the battery of the vehicle.

These and other objects, advantages, purposes and features of this invention will become apparent upon review of the following specification in conjunction with the drawings.

BRIEF DESCRIPTION OF THE DRAWINGS

FIG. 3 is a front elevation of the housing and handle of the present invention;

FIG. 4a is a cross-sectional view taken substantially along line IVa —IVa in FIG. 3;

FIG. 4b is an enlarged view of the area labeled IVb in FIG. 4a;

DESCRIPTION OF THE PREFERRED EMBODIMENTS

Figure 1:
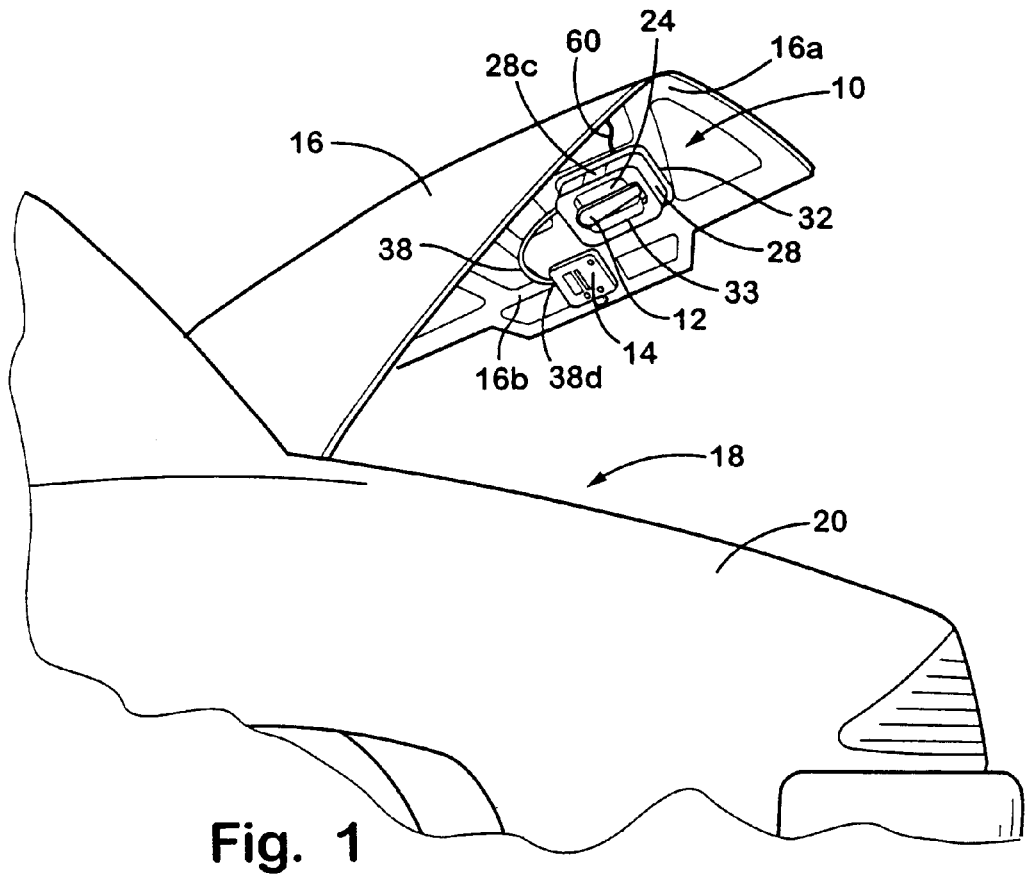
FIG. 1 is a perspective view of a deck lid of a vehicle incorporating the present invention.
Figure 2:
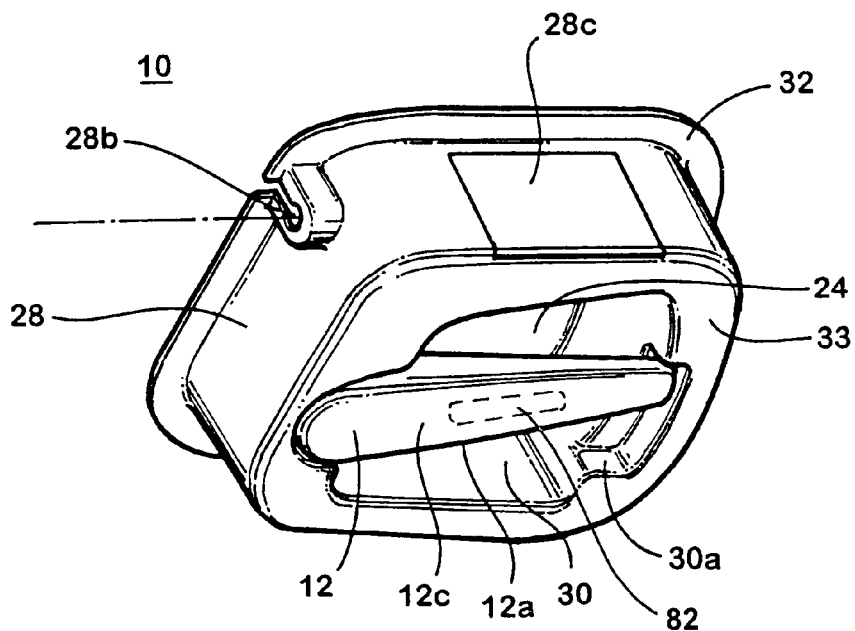
FIG. 2 is a front perspective view of the present invention prior to it being installed in the vehicle.

Referring now specifically to the drawings and the illustrative embodiments depicted therein, there is shown in FIG. 1 a safety release apparatus or assembly 10, which includes a handle 12 which is interconnected to a release mechanism 14 for opening a deck lid or trunk lid or door 16 of a trunk or storage compartment or space 18 of a vehicle 20. The vehicle 20 may be a sedan, coupe or even a hatchback or the like, which includes a trunk or storage compartment or space 18 substantially enclosed by a deck lid or door 16, such as a trunk or the like. Handle 12 of safety release apparatus 10 is interconnected with release mechanism 14 of deck lid 16 such that release mechanism 14 is activated, and deck lid 16 is subsequently opened, in response to a movement of handle 12. Safety release apparatus 10 is mounted on an interior surface 16a of either the deck lid 16 or elsewhere within trunk space 18, so as to allow an operator of safety release apparatus 10 to open the trunk from within trunk space 18. Most preferably, safety release apparatus 10 is mounted on a downward extending portion or waterfall 16b of deck lid 16, as shown in FIG. 1. However, clearly safety release apparatus 10 may be mounted elsewhere within trunk space 18 of vehicle 20, such as on a sidewall of the trunk space or the like, without affecting the scope of the present invention.

Handle 12 of the present invention is preferably injection molded from a resinous polymeric material such as polycarbonate/PBT or polycarbonate/ABS or the like and includes a long handle portion 12a and a shaft portion 12b (FIGS. 4b and 5), which provides for a pivot axis 22 of handle 12. However, handle 12 may alternatively be a switch, push button or any other electromechanical device which may be electronically interconnected to an electronic latch mechanism, such that movement of at least a portion of the device releases the release mechanism in order to open the trunk. It is further envisioned that the handle may be any manual input device, such as a button, switch, touch surface or even a voice activated microphone system, such that the release mechanism is activated in response to a person's voice being detected within trunk space 18, as discussed below.

Preferably, handle 12 is designed and formed so as to be easily recognizable as an opening device for a door or the like, and further is formed with rounded edges along the handle portion 12a so as to make it a comfortable handle for a child or other occupant within the trunk to grasp and operate. Handle 12 may further include text or a picture on a facing surface 12c to convey to an operator of handle 12 that handle 12 is for opening the trunk. Furthermore, the color of handle 12 is preferably selected to be a "friendly" color for children, so that any small child which may become trapped within trunk space 18 will not fear the handle as being something that is hot or otherwise harmful to touch. Preferably, the color selected is a bright green or yellow, which has been shown to convey a bright yet "friendly" or cool to touch appearance to the handle. It is important that the handle be child friendly so that even the smallest and youngest children who may be trapped within the trunk will not be afraid to operate the handle 12.

By providing a light color which does not convey an image of heat or otherwise harmful material, the handle 12 of the present invention is more likely to be grasped and operated by small children than a handle which may otherwise be of a "harmful" color, such as red or orange, which a child may believe is hot to touch. In order to make handle 12 more visible in minimum lighting conditions, handle 12 is also preferably mounted adjacent to a background 24 that is of a substantially darker color than handle 12, so as to provide a stark contrast between the handle and its background for better visibility of the handle in minimal lighting conditions. The background 24 may be a surface of a housing 28 for safety release assembly 10 or may be an interior surface of the trunk space 18 or deck lid 16 itself.

Safety release apparatus 10 preferably is installed within a housing 28, which is secured within trunk space 18 such that handle 12 is positioned within a recess 30 of housing 28. Housing 28 is preferably injection molded from a resinous polymeric material such as polycarbonate/PBT or polycarbonate/ABS or the like and may be black or another dark color. Housing 28 functions to protect handle 12 from being bumped or damaged by items which may be stored within trunk space 18 of vehicle 20. Not only does this prevent damage to handle 12 or other components of safety release apparatus 10, but housing 28 also substantially precludes the possibility of handle 12 being accidentally contacted and moved by the stored items so as to prevent unintentional opening of trunk space 18.

As best shown in FIGS. 2–4a, housing 28 includes a substantially flat and outward extending flange 32 along its rearward end and a raised perimeter, front surface 33. Flange 32 allows for easy installation of the present invention, as fasteners or adhesive or the like may be inserted through or applied to flange 32 and then secured to an interior surface of either deck lid 16 or other interior surface of the trunk space 18 of the vehicle 20. Clearly, the safety release apparatus 10 may be installed on a vehicle during the assembly of the vehicle by the manufacturer, or may be installed later as an after market unit, without affecting the scope of the present invention.

Handle 12 is preferably positioned within recess 30 of housing 28 below or behind the plane of front surface 33 such that the handle may pivot about its axis 22 within recess 30. Perimeter surface 33 helps protect handle 12 from stored items within trunk space or compartment 18, and helps prevent accidental activation of handle 12. Recess 30 may also include at least one stop 30a, which limits rotational travel of handle 12 within a predetermined range. Preferably, as shown in FIGS. 4a and 4b, handle 12 includes a cylindrical bearing or barrel section 35 which has longitudinally extending sections 35a separated by slots which are generally parallel to the pivot axis 22 of handle 12. The slots allow the longitudinally extending sections 35a to flex inward as shaft portion 12b is inserted into opening 28a in housing 28. Barrel section 35 may also include a plurality of resilient, angled flange or tabs 35b formed at a free end 35c of longitudinally extending sections 35a and extending radially outwardly therefrom. Tabs 35b each have an inclined outer edge or surface 35d and a substantially flat, planar edge 35e extending generally perpendicular to axis 22 when handle 12 is mounted in opening 28a. As shaft 12b is inserted into opening 28a, the inclined surfaces 35d of tabs 35b engage the opening 28a and cam the longitudinally extending sections 35a inwardly and guide insertion of barrel section 35 through opening 28a. As tabs 35b protrude through opening 28a, flat edges 35e engage an interior surface 28e of housing 28 adjacent opening 28a so as to snap fit handle 12 into housing 28. This allows handle 12 to be easily rotated within opening 28a, yet substantially precludes handle 12 from being pulled outward from opening 28a.

Additionally, a biasing member 34, such as a torsional spring or the like (FIG. 5), may be provided about shaft portion 12b of handle 12 in order to bias handle 12 in an initial position. Biasing member 34 preferably is positioned around a lower end or portion 37 of handle shaft portion 12b, such that one end 34a of biasing member 34 engages a stop tab 34b on housing 28 and another end 34c engages a slot 37a along lower portion 37 of shaft portion 12b. This substantially fixes both ends 34a and 34c of biasing member 34 so that rotational movement of handle 12 about axis 22 winds the torsional spring, which then provides a rotational force on shaft portion 12b to return handle 12 to its initial position.

Figure 5:
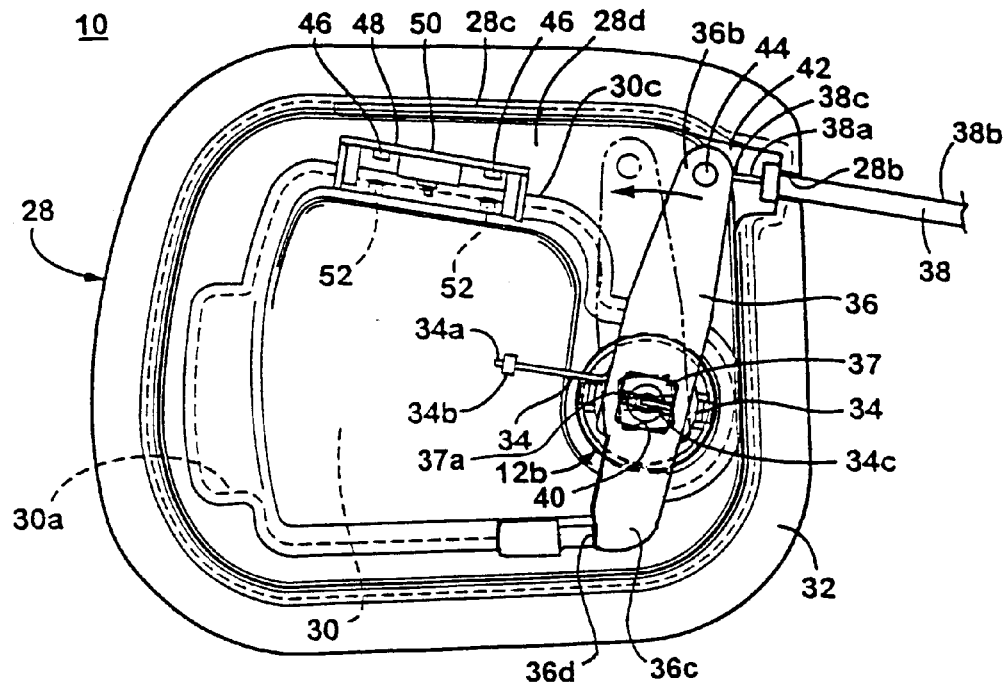
FIG. 5 is a rear elevation of the present invention.

Preferably, handle 12 is interconnected to release mechanism 14 by a lever 36 and a cable 38, as best shown in FIGS. 4a and 5. The lever 36 is attached to lower portion 37 of shaft 12b, which extends downward from handle 12a through barrel section 35 and is of a lesser diameter than barrel section 35. Lower portion 37 is substantially non-circular at its free end and includes slot 37a extending longitudinally along its axis 22. Slot 37a allows lower portion 37 to flex inward for attachment of lever 36 thereto and further provides for the end 34c of biasing member 34, as discussed above. An annular groove 37b may also be included around lower portion 37 for securing lever 36 thereto.

As best shown in FIGS. 4a and 4b, lever 36 is preferably a substantially straight lever arm, which includes an opening 40 at a center region 36a through which lower portion 37 of shaft 12b is inserted, such that lever 36 is fixedly secured to shaft 12b of handle 12. Lever 36 may include angled tabs 40a protruding inwardly at opening 40 to engage a corresponding lip 37c along groove 37b of shaft 12b, thereby snapping lever 36 onto lower portion 37 to prevent lever 36 from being removed from shaft 12b. Tabs 40a of lever 36 function similarly to tabs 35b of barrel section 35 as they engage lip 37c and prevent lever 36 from being removed from shaft 12b. As lower portion 37 of shaft 12b is inserted through opening 40 in lever 36, tabs 40a cam lower portion 37 inward, as slot 37a allows lower portion 37 to flex inwardly, until tabs 40*a* snap into groove 37*b*. Preferably, both opening 40 and lower portion 37 of shaft 12*b* are correspondingly substantially non-circular, such that lever 36 cannot rotate relative to shaft 12*b*. More preferably, opening 40 and lower shaft portion 37 are substantially square as shown in FIG. 5.

At a cable end 36*b* of lever 36, there is located an attaching slot 42 or the like, which may be secured to cable 38. An opposite end 36*c* of lever 36 may extend from center region 36*a* and provide an engaging surface 36*d*, such as a flattened or notched region, for engagement with an electrically operable actuating device or release assist device 84, as discussed below. As shown in FIGS. 4*a* and 5, an underside of housing 28 provides for a cavity in which lever 36 is also substantially encased, again to prevent damage to the lever and to further prevent accidental activation of the release mechanism 14.

Cable 38 preferably comprises an inner cable 38*a* and an outer sheath 38*b* through which inner cable 38*a* may travel. At each end 38*c* and 38*d* of inner cable 38*a* is a pin 44 for engaging a corresponding slot or other attaching means. Pin 44 on a first end 38*c* of inner cable 38*a* is secured to slot 42 on lever 36 while a pin (not shown) on a second end 38*d* of inner cable 38*a* is likewise secured to a slot (not shown) on release mechanism 14. Outer sheath 38*b* of cable 38 is secured to housing 28 through a cable opening 28*b* in one side and to a bracket (not shown) substantially adjacent release mechanism 14. Movement of first end 38*c* of inner cable 38*a* therefore results in a substantially similar amount of travel of second end 38*d* of inner cable 38*a*, while cable 38 is maintained by sheath 38*b* in a predetermined path between housing 28 and release mechanism 14.

When handle 12*a* is grasped and pivoted about its pivot axis 22, lever 36 is correspondingly pivoted about the same axis 22. As shown in FIG. 5, this results in cable end 36*b* of lever 36 traveling along an arcuate path which causes a linear travel of substantially the same distance to occur to first end 38*c* of inner cable 38*a*. As first end 38*c* travels along the arcuate path, second end 38*d* of inner cable likewise is moved a linear distance substantially equal to the linear travel of first end 38*c*. Safety release assembly 10 is designed such that pivoting handle 12*a* until handle 12*a* is approximately at stop 30*a* in recess 30 results in a predetermined amount of cable travel in cable 38 so as to activate release mechanism 14, thereby opening deck lid 16 of vehicle 20. Preferably, this pivot requirement is less than approximately a 15-degree rotation of handle 12. Although shown and described as including a lever and cable to activate release mechanism 14, clearly the present invention may incorporate other mechanical means for interconnecting the handle 12 to the release mechanism 14, without affecting the scope of the present invention. For example, end 36*b* of lever 36 may be directly connected to release mechanism 14 or to another form of linkage, such as an additional lever arm or the like.

Preferably, actuating device 84 is operable to ease movement of the handle and lever to activate the release mechanism and open the trunk of the vehicle. Actuating device 84 is preferably an electrically operable pull mechanism, such as a solenoid or a muscle wire, which is operable to pull (or push or provide other appropriate motion to) a mechanical linkage or cable mechanism to actuate the trunk release mechanism 14 in response to an electrical signal. Actuating device 84 may be operable to assist movement of the handle as the handle is being moved, or may be operable independent of movement of the handle, such that actuating device 84 may activate release mechanism 14 in response to an activating event or to movement of handle 12 or detection of an occupant within the trunk space, as discussed below. Preferably, actuating device 84 comprises a solenoid, as shown in FIG. 5, which is operable to engage the engaging surface 36*d* of end 36*c* of lever 36 and to pivot lever 36, and thus handle 12, toward an opening position to activate the release mechanism, when actuating device or solenoid 84 is activated. The solenoid or actuating device 84 may be mounted at lever 36 such that solenoid or actuating device 84 is operable to either push or pull the lever arm in order to activate the release mechanism 14 of the trunk.

Preferably, actuating device or solenoid 84 is oriented such that handle 12 may still be pivoted toward the open position independent of activation of the solenoid, such that the handle is still fully operational without assistance from assist device or actuating device 84, in order to provide a fully mechanical release of the trunk if power is disconnected from safety release assembly 10. The solenoid may be mounted at safety release assembly 10 to directly pivot the lever arm, or may be mounted external to the release assembly, such that the solenoid indirectly causes movement of the lever arm and/or the mechanical linkage to release the trunk. Alternately, the assist device may be positioned immediately adjacent to or at the trunk release mechanism 14 to directly activate the release mechanism in response to a movement of handle 12 or an occupant detection. Although shown and described as a solenoid which is engaged with lever 36, the actuating device 84 may otherwise comprise a conventional solenoid for activating the release mechanism of the trunk via a button or other switch positioned in the cabin of the vehicle, a muscle wire (a known wiring which is operable to contract when electricity is applied thereto. Muscle wires, which are also known as shape memory alloys, can assume radically different forms or "phases" at distinct temperatures. When conducting an electric current, the muscle wire heats and shortens in length, generating a usable amount of force. Muscle wires typically are bi-metals such as of a nickel-titanium alloy such as Nitinol) attached to assembly 10 such that as the wire contracts when electricity is applied, the contraction of the wire pulls at and assists in pivoting the handle or in activating the release mechanism, or independently activates the release mechanism, in response to movement of handle 12 or detection of a person or animal within the trunk space. Also, the assist device, such as actuating device 84, can comprise a motor mechanism and/or a motor-driven gear, without affecting the scope of the present invention.

Alternately, the assist device can optionally comprise a compressed gas source that, upon detection of an occupant trapped in a trunk compartment and/or upon a trapped occupant touching or pulling a trunk release handle or element, a gas powered-cylinder can be actuated to generate the pull needed to release the trunk latch mechanism and thus release the trunk lid to allow the trapped occupant to escape. Thus, for example, actuating device 84 can comprise a gas-operated piston in communication with a compressed gas (such as air or carbon dioxide) cylinder. For example, pressurized carbon dioxide can be held in a compact capsule or cartridge that is readily removable for service replacement after discharge. When a trapped person contacts a trunk release element, such as an active trunk release handle and/or a passive detector (such as a pyro sensor or similar thermal sensor, such as are disclosed in co-pending and commonly assigned U.S. patent application Ser. No. 08/901,929, filed Jul. 27, 1997 by Gimtong Teowee et al. of Donnelly Corporation entitled PYROELECTRIC INTRUSION DETECTION IN MOTOR VEHICLES, now U.S.

Pat. No. 6,166,625, the entire disclosure of which is hereby incorporated by reference herein), indicating that a person is trapped, the gas cylinder is caused to discharge into the gas-powered piston, which pulls a cable or the like to release the trunk latch. Since the power used to release the latch is provided by the compressed gas source, this can occur even in the complete absence of electric power in the trunk (such as might be the case in an abandoned vehicle whose battery has depleted). Therefore, by combining a manually operable trunk release handle with a compressed gas-actuated assist element, the mechanical advantage of the handle can be greatly enhanced. Thus, for example, a trapped child, attracted to a self-luminous trunk release handle, need only exert sufficient force to open the valve of the compressed gas cylinder or cartridge to release the compressed gas to actuate a piston that pulls a cable that releases the trunk latch.

Alternately, or additionally, the assist device of this present invention can comprise a mechanical assist device such as a coiled spring that stores potential energy in a compressed spring member. Thus, for example, a trapped child, attracted to a trunk release handle, need only exert sufficient force to displace a mechanical member, such as a pin or the like, that is holding back a coiled spring that, when so released, pulls a cable that releases the trunk latch. Having a trunk release module that includes a manual release handle and a compressed gas-powered assist device and/or a mechanical assist device such as a compressed spring member is an advantage since their successful operation is dependent neither on presence of electrical power nor on the strength of the trapped occupant. Therefore, with such non-electrical assist devices, the only effort required of, for example, a child trapped in a trunk compartment, is pressing a button or moving a handle or a similar low-effort user-input action. This low-effort user-input action serves as a trigger that actuates the assist device (such as releasing a valve on a compressed gas source or moving a pin to release a compressed spring that is storing potential energy), and requires application of minimal force by the user. Once so triggered, the assist device, be it a gas-assist device or a spring-assist device, provides the power to generate the force that pulls the trunk lid release latch to release the trunk lid and so enable the trapped occupant to escape. Note that the assist device can be located at, and optionally as part of, the trunk latch mechanism.

Although safety release assembly 10 is shown and described as including a handle, lever and cable system, it is further envisioned that other means of activating a release latch or mechanism may be implemented. For example, for a vehicle including an electronically operated latch, the safety release assembly may include an electro-mechanical device for signaling or activating the latch and thus opening the deck lid. The electro-mechanical device may be a push button, handle or switch positioned within the trunk space and electronically interconnected with the latch mechanism, such that activation or movement of the device energizes a solenoid within the latch mechanism or otherwise causes the latch mechanism to release, thereby opening the trunk. The device may be a bright color and may be easily recognized and operated by a small child in accordance with the present invention as discussed above.

Preferably, safety release assembly 10 further comprises at least one illumination source 46 and/or 82 for providing illumination to handle 12, and an electronic control circuit 48 for at least temporarily activating the illumination source 46 and/or 82 in response to at least one activating event, as discussed below. The illumination source may be a direct source 82 or may be an indirect source 46 of illumination at handle 12. The illumination provided by illumination source 46 or 82 allows a person who may be trapped within trunk space 18 to see handle 12 so as to grasp the handle and open the trunk, as the trunk space would otherwise be too dark for a person to see where the handle is located. This is especially critical when a child is trapped in the trunk, as a child would not even know to look for such a handle, much less know where the handle may be positioned within the trunk. Most preferably, the light emitted by illumination source 46 or 82 will be of low intensity and a "friendly" color to avoid frightening a child, who may believe that the handle is hot if it is illuminated by a bright light or the like.

Preferably, the illumination source comprises a handle illumination source 82 positioned at or along handle 12, to provide direct illumination of handle 12. Handle illumination source 82 may comprise any known lighting source and preferably comprises a light source which has a minimal or no draw of current from the vehicle battery or the power source. Alternately, or in addition thereto, handle illumination source 82 may be provided by handle 12 being made out of a highly visible and glowing phosphorescent material or the like. Preferably, handle illumination source 82 comprises a self-luminous light source, which provides continuous illumination without a draw of current from a power source and without the need for periodic exposure to light (such as is the case with conventional phosphorescent materials which, because they lose their light emission intensity when stored in the dark without exposure to a light source to recharge, are not self-luminous light sources). Self-luminous light sources are preferred over phosphorescent or fluorescent materials, since self-luminous light sources do not require light, such as sunlight, to charge. In contrast to self-luminous light sources, the illumination provided by phosphorescent and/or fluorescent materials decreases in intensity the longer the materials remain in a dark or dimly or sporadically lit area. Because the light source of the present invention is located within the trunk of a vehicle, there will be little, if any, ambient light present for prolonged periods of time. A self-luminous light source is thus preferred, since it provides substantially constant illumination intensity regardless of the surrounding lighting conditions. Preferably, the self-luminous light source is operable to provide light and intensity of at least approximately 5,000 micro-lamberts. The self-luminous and self-sufficient light source preferably comprises a Tritium gas capsule, which requires no light or electricity to charge and thus provides illumination, via radioactive decay of the elements, with no draw on the vehicle's battery. Tritium gas capsules are known and are available in various sizes, shapes, and colors, such as those commercially available from SRB Technologies Inc. of Winston-Salem, N.C. The Tritium gas capsules comprise an isotope of hydrogen which has a long operable life of at least approximately 12 years. These self-sufficient light sources comprise low levels of radioactive material, but are safe and have been approved for various consumer applications. A suitable self-sustaining light source is available from SRB Technologies Inc of Winston-Salem, N.C. under the trade name SAUNDERS-ROE BETALIGHT®, and requires no electrical energy or light exposure to illuminate.

Preferably, handle illumination source 82 further comprises a back lit, substantially transparent panel 86, which may further comprise a symbol or icon 86a, such as a vehicle with a trunk open (FIG. 3) or an arrow in the direction which the handle should be moved to open the trunk, or any text or other picture which may convey to a person within the trunk that movement of the handle will activate the release mechanism of the trunk. Handle 12 may then comprise a light recess 12d along its surface 12c. Light recess 12d may be recessed within a back lit panel recess 12e along surface 12c, such that the substantially transparent panel 86 is mountable within recess 12e and substantially encases illumination source 82 within light recess 12d. Handle illumination source 82 is securable along and within light recess 12d to provide direct illumination of handle 12 from within handle 12. Although shown and described as being positioned along handle 12, an indirect light source may be positioned elsewhere at safety release assembly 10 or elsewhere within trunk space 18 to provide an indirect illumination of handle 12 when the trunk is closed, without affecting the scope of the present invention.

As shown in FIGS. 4a and 5, illumination source 46 may alternately (or additionally) be located on a circuit board or chip 50 containing control 48, and may be substantially encased along with control 48 within housing 28 in order to prevent damage to illumination source 46 or control 48 by items stored within the trunk. Illumination source 46 may project light through at least one slot or opening 52 in a side wall 30b of recess 30 such that illumination source 46 is directed toward handle portion 12a of handle 12. Handle portion 12a may also be twisted or angled such that the facing surface 12c of handle portion 12a is angled toward illumination source 46 in order to receive and reflect illumination from illumination source 46 over a greater surface area. A removable access panel 28c (FIG. 2) may also be included on housing 28 to provide for easy access for installation and maintenance of both control circuit 48 and illumination source 46 within a cavity 28d formed by housing 28. Preferably, control circuit 48 is snap fit onto an interior side 30c of sidewall 30b such that illumination source 46 is aligned with slot 52. Control circuit 48 further includes a wiring harness and connector 60 for connecting control circuit 48 to a power source (not shown) located on vehicle 20, such as the vehicle battery or the like.

Illumination source 46 is thus provided to illuminate handle 12 when the deck lid of 16 of vehicle 20 is closed, since the trunk space 18 becomes very dark when fully enclosed. Illumination source 46 may comprise a self luminous light source or may comprise at least one light emitting diode (LED) or other non-incandescent illumination source (such as organic or inorganic electroluminescent sources, phosphorescent sources, etc.), since these types of illumination sources eliminate or minimize the drain on the vehicle battery when they are activated, as well as being highly durable and long-lasting. The light sources may be selected to provide illumination in a preferred color, such as green or yellow, and may be selected to draw a minimal amount of current from the vehicle battery or the like. Preferably, an LED is selected which draws less than about 45 milliamps when activated, and more preferably, the LED draws less than or equal to about 30 milliamps when activated. Such LEDs are commercially available, examples being a HYPER-BRIGHT LED manufactured by Siemens or other LEDs manufactured by HEWLETT-PACKARD. Most preferably, illumination source 46 comprises at least two LEDs, so that if one fails for some unforeseen reason, there is still at least one additional LED providing illumination to handle 12. Although illumination source 46 is shown and described as an LED or the like, clearly other illumination sources may be provided in varying locations within the trunk without affecting the scope of the present invention. Additionally, illumination source 46 may be an incandescent source, such as a filament lamp, a halogen lamp, a neon lamp, or the like. Illumination source 46 may also serve as the standard trunk light, which is normally activated when the trunk or deck lid is opened, thereby providing light to the entire trunk space when the trunk is closed.

Figure 6:
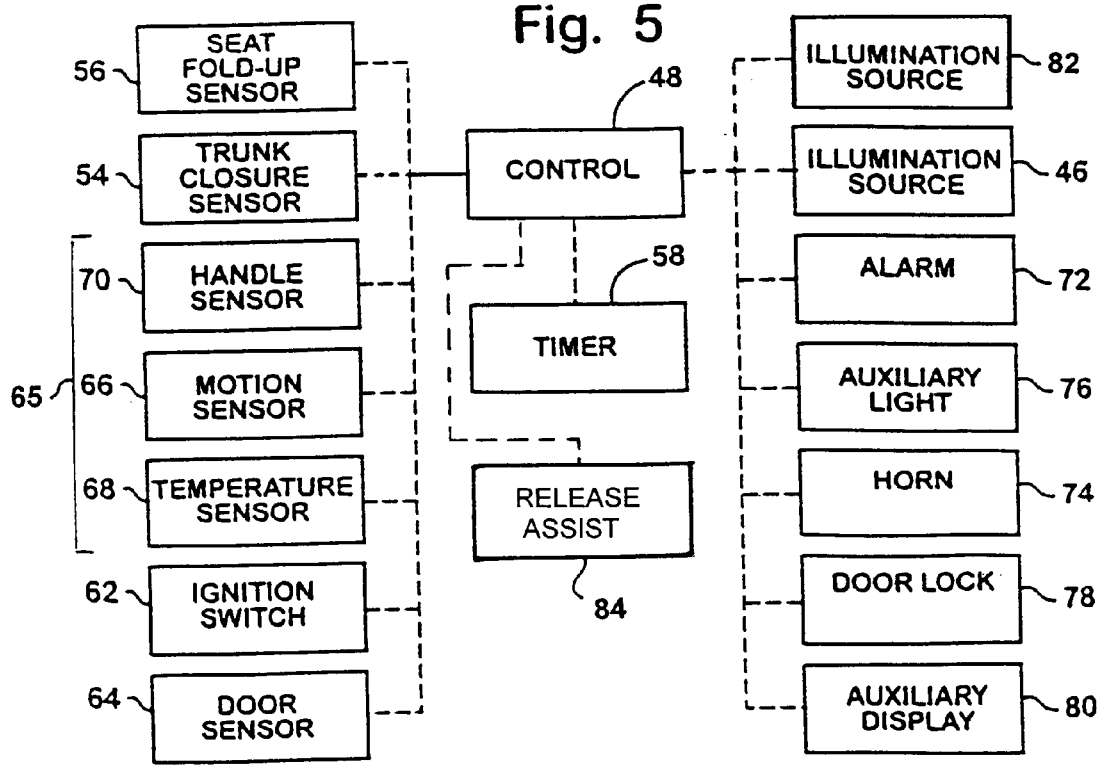
FIG. 6 is a block diagram of the control circuit of the present invention.

If illumination source 46 and/or 82 comprises a self-luminous light source, then the illumination source is thus continuously activated or luminescent. Alternately, however, control 48 may be operable to activate illumination source 46 or handle illumination source 82 upon an occurrence of an activating event. The activating event may be the closing of deck lid 16 and/or the closing or folding back of any fold-down rear seats which may be present in vehicle 20. For example, as shown in FIG. 6, vehicle 20 may include a trunk closure sensor 54 and/or a seat sensor 56 to provide a signal to control circuit 48 when the trunk is closed or the seats are folded to their upright position, thereby enclosing trunk space 18. Preferably, control circuit 48 also functions to deactivate illumination source 46 after a period of time following the activating event. For example, control circuit 48 may include a timer or other timing mechanism 58 which triggers deactivation of illumination source 46 after a predetermined period of time, such as thirty minutes or an hour, has elapsed following the initial activation of illumination source 46. Control circuit 48 continues to reset and reactivate illumination source 46 upon subsequent occurrences of one or more activating events, following deactivation of illumination source 46 after the predetermined period of time has elapsed.

Referring now to FIG. 6, control circuit 48 may also activate illumination source 46 and/or 82 in response to additional activating events, such as an ignition switch 62 of vehicle 20 being activated, a door sensor 64 signaling that a door of vehicle 20 is being opened or closed or other functions of vehicle 20 which pertain to the entering or leaving of vehicle 20 or movement of the vehicle. Safety release assembly 10 may further include one or more occupant sensors 65, such as a motion detector or sensor 66 (such as a pyro detector, and preferably a low current pyro detector as are disclosed in co-pending and commonly assigned U.S. patent application Ser. No. 08/901,929, filed Jul. 27,1997 by Gimtong Teowee et al. of Donnelly Corporation entitled PYROELECTRIC INTRUSION DETECTION IN MOTOR VEHICLES, now U.S. Pat. No. 6,166, 625) and/or a temperature sensor 68, such as a bolometer, within trunk space 18, so as to provide a signal to control circuit 48 when a movement or predetermined temperature of an object in trunk space 18 is detected. The occupant sensor 65 may be of the type disclosed in commonly assigned, U.S. patent application, Ser. No. 09/484,754, filed Jan. 18, 2000 by McCarthy et al. for COMPARTMENT SENSING SYSTEM, now U.S. Pat. No. 6,480,103, the disclosure of which is hereby incorporated herein by reference. Safety release assembly 10 may also comprise a handle sensor 70 which detects contact with or movement of handle 12 to provide an additional signal to control circuit 48. Handle sensor 70 may be a push button or a motion detector at handle 12, or may be a touch pad at a surface of handle 12, which senses contact of handle 12. The touch pad may be temperature sensitive, so as to be capable of discriminating between the touch of a person and contact of the handle by an item stored within trunk space 18. The touch pad or soft touch surface of handle 12 may detect and discriminate human touch from other items via capacitive, resistive or inductive activation and control 48 may then activate the illumination source 46 and/or 82 and/or the actuating or assist device 84 in response to such discrimination.

Preferably, the trunk occupancy detection sensor or sensors are passive sensors which substantially continuously monitor the trunk space or handle when the deck lid is closed. Control circuit 48 may then, in response to a signal from the motion detector 66, the temperature sensor 68, or the handle sensor 70, activate illumination source 46 and/or 82 to provide illumination of handle 12 in trunk space 18 or may activate assist or actuating device 84. Furthermore, in response to such signals, which convey a message that a person or animal may be entrapped within trunk space 18, control circuit 48 may activate other additional auxiliary signals or displays. For example, control circuit 48 may activate an alarm 72, a horn 74, an auxiliary light 76 elsewhere on vehicle 20, a door or trunk lock or lock release system 78 of vehicle 20, an auxiliary message display 80, which may be within vehicle 20 or remote from the vehicle, or the like, in order to provide an operator or anyone else within the vicinity of vehicle 20 information pertaining to a person or animal being entrapped within the trunk space 18 of the vehicle. The alarm 72, auxiliary light 76, horn 74, message display 80, lock or lock release system 78 or the like may be activated upon a first detection of motion or temperature within trunk space 18, or may alternatively be activated upon a second, third, or fourth occurrence of such detections. The number of detections required prior to an alarm or the like being activated by control circuit 48 are preferably reset following an opening and closing of deck lid 16 or a folding down of a rear seat within vehicle 20, if applicable. It is further envisioned that control 48 may activate a voice chip and speaker, in order to convey a voice message which provides instructions as to how to open the trunk, in response to detection of an occupant therein.

Preferably, illumination source 82 is self-luminous and thus continuously luminescent, and control 48 is operable to activate actuating or assist device 84 in response to occupant sensors 65. As discussed above, the control 48 may further activate an alarm, horn, an auxiliary light, an auxiliary message display or the like in response to such a detection. The passive occupancy detection sensors and the control 48 are thus operable as a "smart release" system, which is operable to activate the release mechanism 14 of the deck lid 16 when a person or animal is sensed or detected within the trunk. The control 48 may further function to first determine whether or not the vehicle is moving prior to activating assist device or actuating device 84, in order to prevent opening the trunk while the vehicle is being driven down the road. The control may thus be interconnected to other vehicle sensors, such as the ignition, a wheel speed sensor, or the like to determine the status of the vehicle prior to opening the trunk. If the trunk release mechanism 14 is an electrical release, the mechanism is typically locked out or inoperable when the vehicle ignition is on. The control 48 may be otherwise operable to initially activate illumination source 46 and/or 82 upon a first activating event, as discussed above, and delay activation of actuating or assist device 84 until the smart release occupant sensors confirm that an occupant is within the trunk space of the vehicle. For example, control 48 may delay actuation of actuating or assist device 84 until two or more movements are detected within the trunk space or until a threshold temperature is measured over a prolonged period of time. However, control 48 may also be operable to activate actuating or assist device 84 in response to a first touch or movement of handle 12. In vehicles that already comprise an electrical trunk latch/release mechanism, the electrical release mechanism may be electrically actuated to automatically open the trunk in response to any movement of handle 12 and/or the occupant detection sensors 65. The electrical release mechanism may thus be operable to assist in the opening of the trunk with handle 12 or to automatically open the trunk independent of further movement of handle 12.

When installed in the vehicle, the present invention therefore provides for illumination source 46 and/or 82 to be continuously on or activated for a period of time following closure of the trunk and/or a folding of rear seats of vehicle 20. While the illumination source 46 and/or 82 is activated, a child or other person who may be entrapped within trunk space 18 will be able to easily see and identify handle 12. Because it is difficult for a person to move about within the small trunk space of a typical vehicle, and because typically it is a very small child that may be entrapped therein, the present invention also provides a handle 12 which is very easily pivoted about its axis so as to open deck lid 16 of vehicle 20. Preferably, handle 12, lever 36 and cable 38 cooperate to allow release mechanism 14 of deck lid 16 to be opened with only a minimal amount of force being applied to handle portion 12a. The force required to pivot handle 12 about its pivot axis 22, thereby activating release mechanism 14 of deck lid 16, is preferably less than or equal to about 20 Newtons applied in a direction substantially perpendicular to the handle portion 12a. More preferably, the force required to open deck lid 16 is less than or equal to about 15 Newtons and most preferably, the force required is less than or equal to about 10 Newtons. Furthermore, activation of actuating or assist device 84 further increases the mechanical advantage of the system, such that an even lesser or little to essentially no force is required to pivot the handle and open the trunk. A person who is trapped within trunk space 18, upon identifying the handle 12 as a means in which to open the trunk of the vehicle, merely grasps the handle and easily pivots the handle, which subsequently activates release mechanism 14 of vehicle 20 as discussed above. Once release mechanism 14 is activated, the trunk lid may be easily pushed open so as to allow the person to get out of the trunk.

Figure 7:
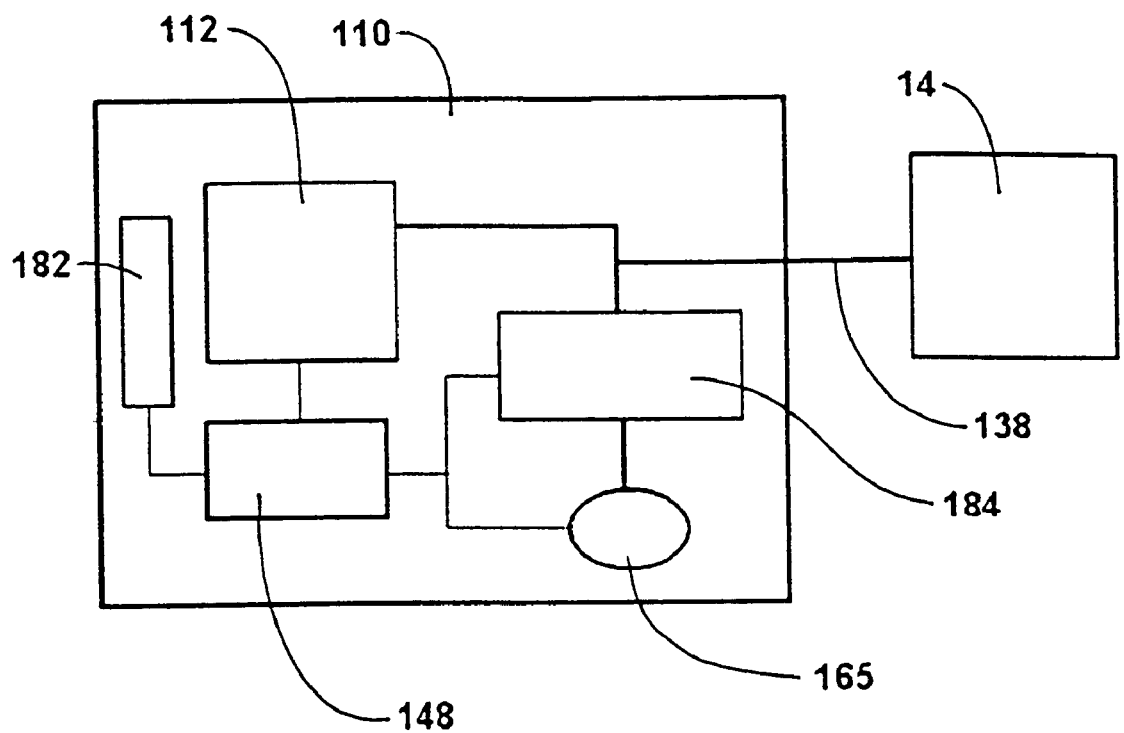
FIG. 7 is a block diagram of an active/passive trunk release module in accordance with the present invention.

Referring now to FIG. 7, an active/passive trunk release system 100 is operable to actively and passively monitor the trunk space of a vehicle. The system is connected to and includes trunk release mechanism 14, which may be a conventional mechanical release mechanism or may be an electrically operable release mechanism. Trunk release system 100 comprises a trunk release module 110 which is operable to actuate release mechanism 14 in response to detection of an occupant within the trunk space, as discussed below. Preferably, release module 110 is a unitary, substantially enclosed module, which may be manufactured remotely from a vehicle assembly plant and purchased by a vehicle manufacturer and then readily installed in the trunk of a vehicle during manufacture of the vehicle. Alternately, the release module 110 may be readily installed in the trunk of a vehicle as an aftermarket device, without affecting the scope of the present invention. Release module 110 is a self contained, electrically operable unit which needs only to be electrically connected to a power source, such as a vehicle battery, and mechanically or electrically (depending on the vehicle application) connected to the trunk release mechanism 14. Release module 110 may be adapted for implementation with a mechanical or electromechanical trunk release mechanisms which may or may not be designed for electrical actuation.

Trunk release module 110 comprises an actuating device 184, which is preferably substantially similar to actuating device 84, discussed above, and a control 148, which is operable to actuate actuating device 184 in response to an electronic signal. Release module 110 further includes at least one of an active manual input device 112 and/or a passive occupancy detection sensor system or device 165. Actuating device 184 is preferably then operable to actuate, or assist in actuating, release mechanism 14 in response to input device 112. Preferably, actuating device 184 is an electrically operable tensile or pulling mechanism, such as a solenoid or a muscle wire, which provides mechanical assistance to the input device 112 in actuating release mechanism 14 via a cable or linkage 138. Cable or link 138 may be any mechanical linkage between release module 110 and release mechanism 14, such that manual actuation of input device 112 and/or electrical actuation of actuating device 184 (via activation of input device 112 and/or detection of an occupant by occupancy detection system 165 discussed below) causes link 138 to pull on release mechanism 14 to release the deck lid. It is further envisioned that link 138 may otherwise be an electrical signal to an electrically operable trunk release mechanism. The assistance by actuating device 184 may thus greatly increase the mechanical advantage of a handle or the like in opening the trunk of a vehicle. Preferably, control 148 is operable to detect activation of input device 112 and trigger actuating device 184 accordingly.

Active input device 112 is operable to activate trunk release mechanism 14 via linkage or cable 138, in response to a human signal or input. For example, input device 112 may comprise a handle mechanism similar to handle 12 discussed above, where the input may be a contact or turning or rotating of the handle. Alternately, input device 112 may comprise a button, touch panel or the like, where input device 112 activates the release mechanism 14 in response to input device 112 being touched, depressed, moved, or the like. It is further envisioned that input device 112 may even comprise a microphone system which receives a human voice message from an occupant of the trunk and activates the release mechanism 14 in response thereto. Input device 112 thus is operable to actuate release mechanism 14 in response to any active contact or voice message by an occupant of the trunk space of the vehicle.

Release module 110 may alternately, or additionally, include occupancy detection system 165, which is passively operable to detect a presence of a person or animal within the trunk of the vehicle. Occupancy detection system 165 is preferably similar to detection sensors 65 discussed above, and comprises a thermal sensor, such as a pyro detector, and/or a motion detector. The sensor or sensors are preferably operable to continuously monitor the trunk space of the vehicle. If an occupant is detected, actuating device 184 is then actuated to automatically actuate release mechanism 14 to open the trunk of the vehicle. As discussed above with respect to actuating device 84, actuating device 184 may be operable to actuate release mechanism 14 only after it is determined that the vehicle is not moving. It is further envisioned that the occupancy detection system may be operable in a sentinel mode, whereby the sensors monitor the compartment and control 148 is operable to activate an illumination source or an audio device, such as a voice chip, to issue exit instructions, in response to an initial detection of an occupant. Upon further confirming detection of an occupant and/or in response to subsequent input to manual input device 112, actuating device 184 may then function to activate release mechanism 14.

As shown in FIG. 7, trunk release module 110 may further include an illumination source 182 to provide illumination of the trunk space or at least of the input device 112. Illumination source 182 is preferably self-luminous such that it provides continuous illumination of the trunk space. However, illumination source 182 may otherwise be any other form of light source, such as an LED or incandescent bulb, and may be actuable via control 148 in response to an activating event or detection of an occupant within the trunk space, as discussed above. Preferably, illumination source 182 includes one or more light-emitting light sources, such as solid-state light emitting diodes (LED), available from numerous sources. Various colors of LED can be used (or combined) such as blue, white, orange, yellow, red, amber and red-orange. Alternatively, an illumination source may be supplied as a conventional incandescent light source, a halogen light source, a fluorescent light source such as a vacuum fluorescent lamp, a light pipe such as fiber-optic bundle forming a light pipe, and the like. Most preferably, illumination is achieved using non-incandescent light sources, such as light emitting diodes (LEDs), organic light emitting material, electroluminescent sources (both organic and inorganic), and the like, and most preferably such non-incandescent sources are low power and are directed sources, such as described in U.S. Pat. No. 5,938,321 and copending U.S. Pat. Application entitled INTERIOR MIRROR ASSEMBLY FOR A VEHICLE INCORPORATING A SOLID-STATE LIGHT SOURCE, Ser. No. 09/287,926, filed Apr. 7, 1999, now U.S. Pat. No. 6,139,172, which are incorporated herein by reference in their entireties, and such as is disclosed in co-pending and commonly assigned U.S. patent application Ser. No. 09/466,010, filed Dec. 17, 1999, now U.S. Pat. No. 6,420,975, the entire disclosure of which is hereby incorporated by reference herein, and in co-pending and commonly assigned U.S. patent application Ser. No. 09/449,121, filed Nov. 24, 1999 by Barry W. Hutzel et al. of Donnelly Corporation, and entitled REARVIEW MIRROR ASSEMBLY WITH UTILITY FUNCTIONS, now U.S. Pat. No. 6,428,172, the entire disclosure of which is hereby incorporated by reference herein.

Accordingly, trunk release module 110 provides a self-contained module for opening the trunk of a vehicle from within the trunk space. The actuating device may be operable to assist an input device, such as a handle, button, or touch panel in opening the deck lid, and/or may be operable to automatically open the deck lid in response to detection of an occupant within the trunk space. The module is especially adapted for vehicles where the trunk release mechanism is not electrically powered, whereby a cable or other mechanical linkage is movable, via pushing or pulling at a remote end, to release the deck lid. However, the present invention is equally applicable to electrically actuable trunk release mechanisms.

An alternate embodiment of the present invention provides for a module, which comprises a handle, sensors, and/or illumination source, a control, and a housing similar to those discussed above, and further optionally includes a license plate holder and lock cylinder for the deck lid, which are positioned on an exterior surface of the deck lid. This embodiment may also optionally include an exterior handle such that the trunk may be opened from outside the vehicle without having to insert a key within the lock cylinder or otherwise enter the vehicle to release a trunk release lever from within the vehicle. The module is installed through an opening in the trunk lid and preferably includes a lock cylinder and release mechanism for opening the trunk. The module preferably further comprises at least one of an illumination source, which is operable to illuminate the handle, and a release assist device, which is operable to assist an occupant of the trunk in opening the trunk or to automatically open the trunk in response to a smart release sensor system.

Therefore, the present invention provides a safety release apparatus for opening a deck lid or trunk of a vehicle from within the trunk space. The apparatus of the present invention is easy to install in the vehicle, and is easily recognizable and operable by a small child that may become trapped within the trunk of the vehicle. The color and intensity of the handles and illumination are selected to convey a friendly, non-hot appearance to the handle, such that a child will easily see the handle and not be afraid to grasp the handle in order to open the trunk. Furthermore, the control circuit of the present invention is operable to activate the illumination source or other auxiliary signal in response to an activating event and to deactivate the illumination source after a period of time in order to minimize the overall drain on the vehicle battery. The illumination source is also selected to comprise a non-incandescent device, such as an LED or the like, which is highly durable and long lasting, yet requires a minimal amount of energy from the battery of the vehicle, even while it is activated. Alternately, the illumination source may comprise a self-luminous light source, which is operable to continuously illuminate the handle while requiring no current drawn from the battery or power source (which typically is the vehicle battery, although optionally, a separate, auxiliary battery can be provided). Accordingly, even if power is lost to the vehicle, the self luminous illumination source remains operable to illuminate the handle. Alternately, or in addition thereto, the color of the handle may be selected to be a light or bright color, which starkly contrasts the background on which the handle is installed, so as to remain visible in very low light conditions and/or when power is lost.

Although the control circuit of the present invention requires connection to an electrical power source in order to detect an occupant within the trunk space or to actuate the release assist device, and/or to provide illumination to the handle, preferably no electrical power is required to operate the handle and thus release the release mechanism in order to open the trunk of the vehicle. Preferably, the handle, lever, cable and release mechanism are all mechanical devices, and may override the assist device such that the trunk may be opened even when there is a power loss to the vehicle itself. Preferably, the present invention provides a substantially self contained release module which may be installed within the trunk space of a vehicle and connected to the existing trunk release mechanism or latch. The module is operable to provide assistance to the handle in releasing the deck lid or to independently release the deck lid in response to a detection of an occupant within the trunk compartment.

Providing a trunk release module that includes an assist device that may be electrically powered and/or that is gas or spring powered has many advantages, particularly when the components of the module (that can include an active manually-operable trunk release element such as a handle, touch surface or button, and/or a passive, occupant sensing element, such as a thermal sensor assembly that thermally detects body motion in the trunk, and/or an assist device, whether electrically operable such as a solenoid or gas operable such as a gas-operated piston, and/or a coupling/cable connecting to the trunk latch mechanism) are housed together in a unitary module assembly. Thus, an automotive supplier can supply such a unitary module (with the various components assembled together and with the module substantially sealed against contamination from the outside environment such as by rain, dust, dirt and the like) to an automaker to fit into new vehicles being assembled on a new vehicle assembly line, or can supply to the aftermarket as a retrofit for an existing fleet of vehicles.

Changes and modifications in the specifically described embodiments can be carried out without departing from the principles of the invention, which is intended to be limited only by the scope of the appended claims, as interpreted according to the principles of patent law.

The embodiments of the invention in which an exclusive property right or privilege is claimed are defined as follows:

1. A user operable release system adapted for use in opening a deck lid of a vehicle, said release system being positionable within a trunk compartment at least partially closed by the deck lid, the trunk compartment having a release mechanism for opening the deck lid, said release system being adapted for operation by a person positioned in the interior of the trunk compartment, said release system comprising:

a user actuable input device for actuating the release mechanism for opening the dock lid in response to a user input by the person positioned in the interior of the trunk compartment;

a housing adapted to be positioned within the trunk compartment, said housing having at least one wall defining a recess and a perimeter surface at an outer edge of said recess, said user actuable input device being positioned within said recess such that said user actuable input device is within said recess inwardly of said perimeter surface;

at least one illumination source operable to provide illumination for said user actuable input device, said at least one illumination source being positioned at least one of said housing and said user actuable input device; and a control which is operable to at least occasionally activate said at least one illumination source to provide illumination for said user actuable input device.

2. The user operable release system of claim 1, wherein said housing is adapted to be positioned on an interior surface of the trunk compartment.

3. The user operable release system of claim 1, wherein said user actuable input device comprises a mechanical device which is operable to mechanically actuate the release mechanism.

4. The user operable release system of claim 3 including a mechanical assist device which is operable to actuate the release mechanism in response to a low effort user input action to said user actuable input device.

5. The user operable release system of claim 1, wherein said user actuable input device comprises a handle which is pivotable about an axis to actuate the release mechanism.

6. The user operable release system of claim 1, wherein said user actuable input device comprises an electromechanical device.

7. The user operable release system of claim 1, wherein said user actuable input device comprises one of a switch, a push button, a touch surface and a voice activated microphone system.

8. The user operable release system of claim 1, wherein said control is operable to at least occasionally activate said at least one illumination source in response to an activating event.

9. The user operable release system of claim 8, wherein said activating event comprises at least one of a closing of the deck lid, an ignition of the vehicle being activated, an opening of at least one door of the vehicle, a closing of said at least one door of the vehicle and a detection of an occupant within the trunk compartment.

10. The user operable release system of claim 9, wherein said control is operable to at least temporarily activate said at least one illumination source in response to an occupant detection system.

11. The user operable release system of claim 10, wherein said control is operable to activate at least one of an alarm, a lock release, a horn and at least one auxiliary illumination source on the vehicle in response to said occupant detection system.

12. The user operable release system of claim 10, wherein said occupant detection system comprises at least one of a motion detector and a temperature sensor.

13. The user operable release system of claim 8, wherein said control is operable to deactivate said at least one illumination source a period of time following activation of said at least one illumination source.

14. The user operable release system of claim 1, wherein said at least one illumination source is positioned at said user actuable input device.

15. The user operable release system of claim 1, wherein said at least one illumination source is positioned at said at least one wall of said recess of said housing.

16. The user operable release system of claim 1, wherein said at least one illumination source is substantially encased within said housing.

17. The user operable release system of claim 16, wherein said at least one illumination source is operable to project light through at least one opening in said at least one wall of said housing toward said user actuable input device.

18. A user operable release system adapted for use in opening a deck lid of a vehicle, said release system being positionable within a trunk compartment at least partially closed by the deck lid, the trunk compartment having a release mechanism for opening the deck lid, said release system being adapted for operation by a person positioned in the interior of the trunk compartment, said release system comprising:
  a user actuable input device for actuating the release mechanism for opening the deck lid in response to a user input by the person positioned in the interior of the trunk compartment;
  a housing adapted to be positioned within the trunk compartment, said housing having at least one wall defining a recess and a perimeter surface at an outer edge of said recess, said user actuable input device being positioned within said recess such that said user actuable input device is within said recess inwardly of said perimeter surface; and
  at least one illumination source operable to provide illumination for said user actuable input device, said at least one illumination source being positioned at said user actuable input device, wherein said at least one illumination source comprises a back lit icon and a light source, said light source being positioned at least partially within said user actuable input device and said back lit icon being positioned along a surface of said user actuable input device and being illuminated by said light source when said light source is activated.

19. The user operable release system of claim 18, wherein said at least one illumination source comprises a self-luminous light source.

20. A user operable release system adapted for use in opening a deck lid of a vehicle, said release system being positionable within a trunk compartment at least partially closed by the deck lid, the trunk compartment having a release mechanism for opening the deck lid, said release system being adapted for operation by a person positioned in the interior of the trunk compartment, said release system comprising:
  a user actuable input device for actuating the release mechanism for opening the deck lid in response to a user input by the person positioned in the interior of the trunk compartment;
  a housing adapted to be positioned within the trunk compartment, said housing having at least one wall defining a recess, said user actuable input device being positioned substantially within said recess;
  at least one illumination source operable to provide illumination for said user actuable input device, said at least one illumination source being positioned at at least one of said housing and said user actuable input device, said at least one illumination source being activated in response to an activating event, said at least one illumination source being deactivated following a period of time after said activating event; and
  a control which is operable to at least occasionally activate said at least one illumination source to provide illumination for said user actuable input device in response to said activating event.

21. The user operable release system of claim 20, wherein said housing is adapted to be positioned on an interior surface of the trunk compartment.

22. The user operable release system of claim 20, wherein said user actuable input device comprises a mechanical device which is operable to mechanically actuate the release mechanism.

23. The user operable release system of claim 22 including a mechanical assist device which is operable to actuate the release mechanism in response to a low effort user input action to said user actuable input device.

24. The user operable release system of claim 20, wherein said user actuable input device comprises a handle which is pivotable about an axis to actuate the release mechanism.

25. The user operable release system of claim 20, wherein said user actuable input device comprises an electromechanical device.

26. The user operable release system of claim 20, wherein said user actuable input device comprises one of a switch, a push button, a touch surface and a voice activated microphone system.

27. The user operable release system of claim 20, wherein said activating event comprises at least one of a closing of the deck lid, an ignition of the vehicle being activated, an opening of at least one door of the vehicle, a closing of said at least one door of the vehicle and a detection of an occupant within the trunk compartment.

28. The user operable release system of claim 27, wherein said control is operable to temporarily activate said at least one illumination source in response to an occupant detection system.

29. The user operable release system of claim 28, wherein said control is operable to activate at least one of an alarm, a lock release, a horn and at least one auxiliary illumination source on the vehicle in response to said occupant detection system.

30. The user operable release system of claim 28, wherein said occupant detection system comprises at least one of a motion detector and a temperature sensor.

31. The user operable release system of claim 20, wherein said at least one illumination source is positioned at said user actuable input device.

32. The user operable release system of claim 20, wherein said at least one illumination source is positioned at said at least one wall of said recess of said housing.

33. The user operable release system of claim 20, wherein said at least one illumination source is substantially encased within said housing.

34. The user operable release system of claim 33, wherein said at least one illumination source is operable to project light through at least one opening in said at least one wall of said housing toward said user actuable input device.

35. The user operable release system of claim 20, wherein said housing includes a perimeter surface at an outer edge of said recess, said user actuable input device being positioned within said recess such that said user actable input device is within said recess inwardly of said perimeter surface.

36. A user operable release system adapted for use in opening a deck lid of a vehicle, said release system being positionable within a trunk compartment at least partially closed by the deck lid, the trunk compartment having a release mechanism for opening the deck lid, said release system being adapted for operation by a person positioned in the interior of the trunk compartment, said release system comprising:
- a user actuable input device for actuating the release mechanism for opening the deck lid in response to a user input by the person positioned in the interior of the trunk compartment;
- a housing adapted to be positioned within the trunk compartment, said housing having at least one wall defining a recess, said user actuable input device being positioned substantially within said recess; and
- at least one illumination source operable to provide illumination for said user actuable input device, said at least one illumination source being positioned at said user actuable input device, said at least one illumination source being activated in response to an activating event, said at least one illumination source being deactivated following a period of time after said activating event, wherein said at least one illumination source comprises a back lit icon and a light source, said light source being positioned at least partially within said user actuable input device and said back lit icon being positioned along a surface of said user actuable input device and being illuminated by said light source when said light source is activated.

37. A user operable release system adapted for use in opening a deck lid of a vehicle, said release system being positionable within a trunk compartment at least partially closed by the deck lid, the trunk compartment having a release mechanism for opening the deck lid, said release system being adapted for operation by a person positioned in the interior of the trunk compartment, said release system comprising:
- a user actuable input device for actuating the release mechanism for opening the deck lid in response to a user input by the person positioned in the interior of the trunk compartment;
- a housing adapted to be positioned within the trunk compartment, said housing having at least one wall defining a recess and a perimeter surface at an outer edge of said recess, said user actuable input device being positioned within said recess such that said user actuable input device is within said recess inwardly of said perimeter surface;
- at least one illumination source operable to at least occasionally provide illumination for said user actuable input device, said at least one illumination source being positioned at said housing; and
- a control which is operable to of least occasionally activate said at least one illumination source to provide illumination for said user actuable input device.

38. The user operable release system of claim 37, wherein said housing is adapted to be positioned on an interior surface of the trunk compartment.

39. The user operable release system of claim 37, wherein said user actuable input device comprises a mechanical device which is operable to mechanically actuate the release mechanism.

40. The user operable release system of claim 39 including a mechanical assist device which is operable to actuate the release mechanism in response to a low effort user input action to said user actuable input device.

41. The user operable release system of claim 37, wherein said user actuable input device comprises a handle which is pivotable about an axis to actuate the release mechanism.

42. The user operable release system of claim 37, wherein said user actuable input device comprises an electromechanical device.

43. The user operable release system of claim 37, wherein said user actuable input device comprises one of a switch, a push button, a touch surface and a voice activated microphone system.

44. The user operable release system of claim 37, wherein said control is operable to at least occasionally activate said at least one illumination source in response to an activating event.

45. The user operable release system of claim 44, wherein said activating event comprises at least one of a closing of the deck lid, an ignition of the vehicle being activated, an opening of at least one door of the vehicle, a closing of said at least one door of the vehicle and a detection of an occupant within the trunk compartment.

46. The user operable release system of claim 45, wherein said control is operable to at least temporarily activate said at least one illumination source in response to an occupant detection system.

47. The user operable release system of claim 46, wherein said control is operable to activate at least one of an alarm, a lock release, a horn and at least one auxiliary illumination source on the vehicle in response to said occupant detection system.

48. The user operable release system of claim 46, wherein said occupant detection system comprises at least one of a motion detector and a temperature sensor.

49. The user operable release system of claim 44, wherein said control is operable to deactivate said at least one illumination source a period of time following activation of said at least one illumination source.

50. The user operable release system of claim 37, wherein said at least one illumination source is positioned at said at least one wall of said recess of said housing.

51. The user operable release system of claim 37, wherein said at least one illumination source is substantially encased within said housing.

52. The user operable release system of claim 51, wherein said at least one illumination source is operable to project light through at least one opening in said at least one wall of said housing toward said user actuable input device.

53. The user operable release system of claim 37, wherein said at least one illumination source comprises a self-luminous light source.

54. A user operable release system adapted for use in opening a deck lid of a vehicle, said release system being positionable within a trunk compartment at least partially closed by the deck lid, the trunk compartment having a release mechanism for opening the deck lid, said release system being adapted for operation by a person positioned in the interior of the trunk compartment, said release system comprising:
- a user actuable input device for actuating the release mechanism for opening the deck lid in response to a user input by the person positioned in the interior of the trunk compartment;
- a housing adapted to be positioned within the trunk compartment, said housing having at least one wall defining a recess and a perimeter surface at an outer edge of said recess, said user actuable input device being positioned within said recess such that said user actuable input device is within said recess inwardly of said perimeter surface;

at least one illumination source operable to at least occasionally provide illumination for said user actuable input device, said at least one illumination source being positioned at said user actuable input device; and a control which is operable to at least occasionally activate said at least one illumination source to provide illumination for said user actuable input device.

55. The user operable release system of claim 54, wherein said housing is adapted to be positioned on an interior surface of the trunk compartment.

56. The user operable release system of claim 54, wherein said user actuable input device comprises a mechanical device which is operable to mechanically actuate the release mechanism.

57. The user operable release system of claim 56 including a mechanical assist device which is operable to actuate the release mechanism in response to a low effort user input action to said user actuable input device.

58. The user operable release system of claim 54, wherein said user actuable input device comprises a handle which is pivotable about an axis to actuate the release mechanism.

59. The user operable release system of claim 54, wherein said user actuable input device comprises an electromechanical device.

60. The user operable release system of claim 54, wherein said user actuable input device comprises one of a switch, a push button, a touch surface and a voice activated microphone system.

61. The user operable release system of claim 54, wherein said control is operable to at least occasionally activate said at least one illumination source in response to an activating event.

62. The user operable release system of claim 61, wherein said activating event comprises at least one of a closing of the deck lid, an ignition of the vehicle being activated, an opening of at least one door of the vehicle, a closing of said at least one door of the vehicle and a detection of an occupant within the trunk compartment.

63. The user operable release system of claim 62, wherein said control is operable to at least temporarily activate said at least one illumination source in response to an occupant detection system.

64. The user operable release system of claim 63, wherein said control is operable to activate at least one of an alarm, a lock release, a horn and at least one auxiliary illumination source on the vehicle in response to said occupant detection system.

65. The user operable release system of claim 63, wherein said occupant detection system comprises at least one of a motion detector and a temperature sensor.

66. The user operable release system of claim 61, wherein said control is operable to deactivate said at least one illumination source a period of time following activation of said at least one illumination source.

67. A user operable release system adapted for use in opening a deck lid of a vehicle, said release system being positionable within a trunk compartment at least partially closed by the deck lid, the trunk compartment having a release mechanism for opening the deck lid, said release system being adapted for operation by a person positioned in the interior of the trunk compartment, said release system comprising:

a user actuable input device for actuating the release mechanism for opening the deck lid in response to a user input by the person positioned in the interior of the trunk compartment;

a housing adapted to be positioned within the trunk compartment, said housing having at least one wall defining a recess and a perimeter surface at an outer edge or said recess, said user actuable input device being positioned within said recess such that said user actuable input device is within said recess inwardly of said perimeter surface; and at least one illumination source operable to at least occasionally provide illumination for said user actuable input device, said at least one illumination source being positioned at said user actuable input device, wherein said at least one illumination source comprises a back lit icon and a light source, said light source being positioned at least partially within said user actuable input device and said back lit icon being positioned along a surface of said user actuable input device and being illuminated by said light source when said light source is activated.

68. The user operable release system of claim 67, wherein said at least one illumination source comprises a self-luminous light source.

* * * * *

UNITED STATES PATENT AND TRADEMARK OFFICE
CERTIFICATE OF CORRECTION

PATENT NO. : 6,692,056 B2 Page 1 of 1
APPLICATION NO. : 10/144506
DATED : February 17, 2004
INVENTOR(S) : Bingle et al.

It is certified that error appears in the above-identified patent and that said Letters Patent is hereby corrected as shown below:

Column 18
Claim 1, Line 15, "dock" should be --deck--
Claim 1, Line 27, insert --at-- after "at"

Column 21
Claim 35, Line 4, "actable" should be --actuable--
Claim 37, Line 58, "of" should be --at--

Column 24
Claim 67, Line 28, "or" should be --of--

Signed and Sealed this

Twentieth Day of January, 2009

JON W. DUDAS
*Director of the United States Patent and Trademark Office*